US012572510B2

(12) United States Patent
Zhang et al.

(10) Patent No.: US 12,572,510 B2
(45) Date of Patent: Mar. 10, 2026

(54) METHOD, DEVICE AND COMPUTER PROGRAM PRODUCT FOR DATA REPLICATION

(71) Applicant: Dell Products L.P., Round Rock, TX (US)

(72) Inventors: Weibing Zhang, Beijing (CN); Lei Gao, Beijing (CN); Yuan Gu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/978,590

(22) Filed: Dec. 12, 2024

(65) Prior Publication Data

US 2025/0348462 A1 Nov. 13, 2025

(30) Foreign Application Priority Data

May 10, 2024 (CN) ......................... 202410578826.X

(51) Int. Cl.
  *G06F 16/174* (2019.01)
  *G06F 16/182* (2019.01)
(52) U.S. Cl.
  CPC ........ *G06F 16/1744* (2019.01); *G06F 16/184* (2019.01)
(58) Field of Classification Search
  CPC . G06F 16/1744; G06F 16/128; G06F 16/1756
  USPC ......................................................... 707/822
  See application file for complete search history.

(56) References Cited

U.S. PATENT DOCUMENTS

| | | | |
|---|---|---|---|
| 7,003,531 B2 * | 2/2006 | Holenstein | ............ G06F 16/273 |
| 10,467,102 B1 | 11/2019 | Baruch et al. | |
| 11,663,336 B1 | 5/2023 | Armangau et al. | |
| 11,755,733 B1 | 9/2023 | Armangau et al. | |
| 11,989,437 B1 * | 5/2024 | Doddaiah | ............... G06F 3/065 |
| 2011/0099344 A1 * | 4/2011 | Browne | .............. G06F 11/2066 |
| | | | 711/E12.001 |
| 2022/0027311 A1 * | 1/2022 | Hu | ......................... G06F 16/128 |
| 2022/0334724 A1 * | 10/2022 | Wu | ........................ G06F 3/0611 |
| 2022/0342758 A1 * | 10/2022 | Tal | .......................... G06F 3/067 |

* cited by examiner

*Primary Examiner* — Shahid A Alam
(74) *Attorney, Agent, or Firm* — BainwoodHuang

(57) ABSTRACT

Techniques for data replication involve acquiring, in response to receiving a data replication request, compressibility information of a data block at a source end. Such techniques further involve determining a compressibility marker for the data block based on the compressibility information. Such techniques further involve replicating the data block and the compressibility marker to a target end via a transmission path, wherein the compressibility marker indicates whether the data block is compressible at the target end. Accordingly, the transmission delay during data replication can be reduced, and the data throughput can be increased. At the same time, the risk of failing to recover data due to long transmission delay can be reduced. In addition, compression attempts are no longer made on incompressible data blocks thus reducing unnecessary computation during the replication process, thereby achieving efficient utilization of system resources and improving the user experience.

15 Claims, 11 Drawing Sheets

100

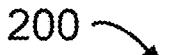

200

202

Acquiring, in response to receiving
a data replication request, compressibility information of
a data block at a source end

204

Determining a compressibility marker for the
data block based on the compressibility information

206

Replicating the data block and the compressibility
marker to a target end via a transmission path,
wherein the compressibility marker indicates
whether the data block is compressible
at the target end

Figure 3B:
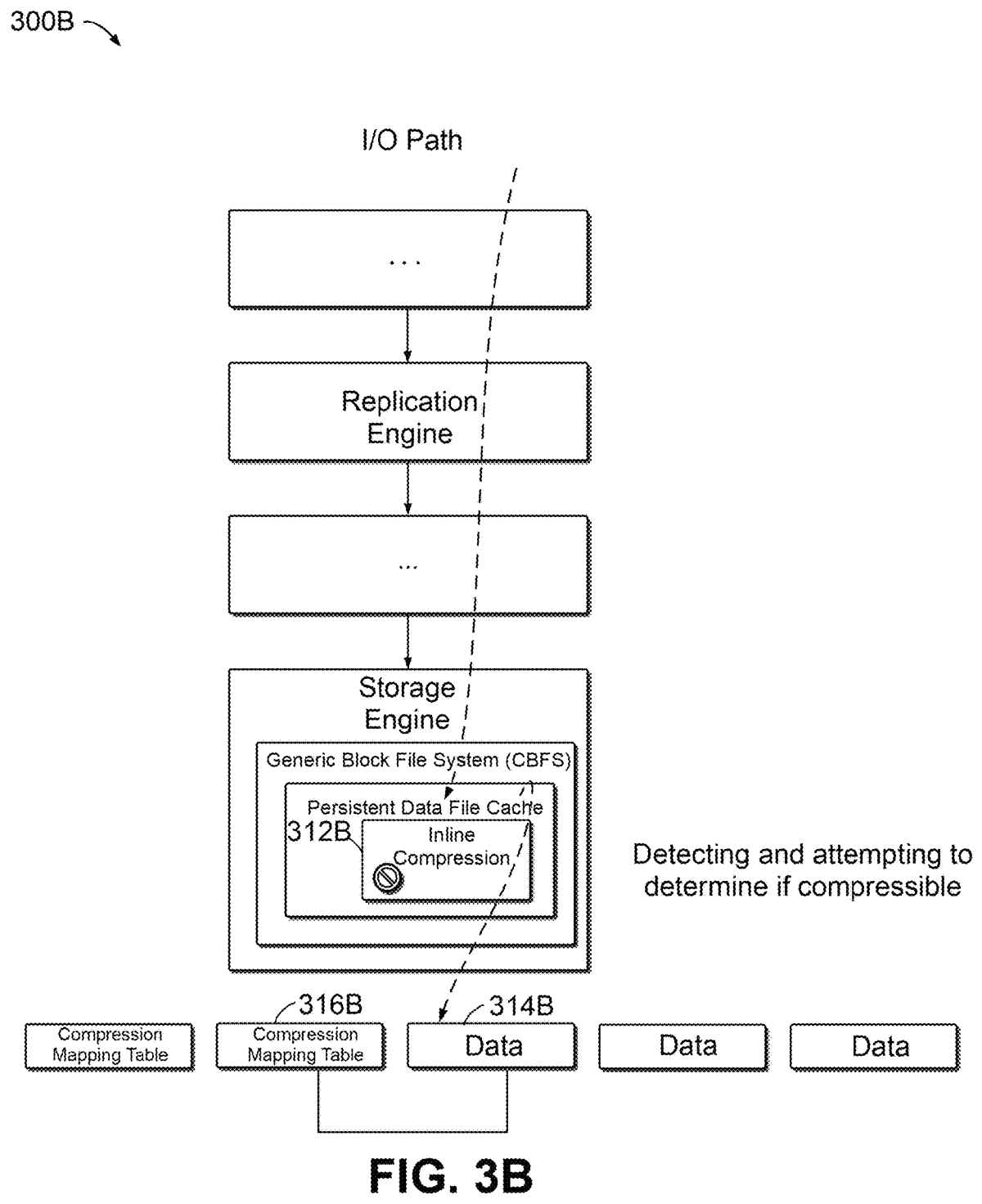

I/O Path

. . .

Replication
Engine

. . .

Storage
Engine

Generic Block File System (CBFS)

Persistent Data File Cache

312B

Inline
Compression

Detecting and attempting to
determine if compressible 316B      314B

| Compression Mapping Table | Compression Mapping Table | Data | Data | Data |

METHOD, DEVICE AND COMPUTER PROGRAM PRODUCT FOR DATA REPLICATION

CROSS-REFERENCE TO RELATED APPLICATION

This application claims priority to Chinese Patent Application No. 202410578826.X, on file at the China National Intellectual Property Administration (CNIPA), having a filing date of May 10, 2024, and having "METHOD, DEVICE AND COMPUTER PROGRAM PRODUCT FOR DATA REPLICATION" as a title, the contents and teachings of which are herein incorporated by reference in their entirety.

TECHNICAL FIELD

The present disclosure relates to the field of computers, and more particularly, to a method, device, and computer program product for data replication.

BACKGROUND

Data replication technology is intended to ensure the reliability and availability of data by replicating the data from one storage location to another one or more locations. Data replication may be synchronous or asynchronous. Data compression technology is a technology that converts raw data into a more compact and less space-consuming format. The data compression technology is widely used in the fields of data storage, transmission, and processing.

The data replication technology and the data compression technology are somewhat correlated in data processing and storage. In some cases, data replication may need to be combined with the data compression technology to reduce the amount of data to be transmitted during the replication process. At the same time, with the data compression technology, the occupation of storage space can be reduced, thereby providing more storage resources and backup space for data replication.

SUMMARY OF THE INVENTION

Embodiments of the present disclosure provide a method, device, and computer program product for data replication.

In a first aspect of embodiments of the present disclosure, a method for data replication is provided. The method includes acquiring, in response to receiving a data replication request, compressibility information of a data block at a source end. The method further includes determining a compressibility marker for the data block based on the compressibility information. In addition, the method further includes replicating the data block and the compressibility marker to a target end via a transmission path, where the compressibility marker indicates whether the data block is compressible at the target end.

In a second aspect of the embodiments of the present disclosure, an electronic device is provided. The electronic device includes one or more processors; and a storage apparatus for storing one or more programs, where the one or more programs, when executed by the one or more processors, cause the one or more processors to implement a method for data replication, the method including acquiring, in response to receiving a data replication request, compressibility information of a data block at a source end. The method further includes determining a compressibility marker for the data block based on the compressibility information. In addition, the method further includes replicating the data block and the compressibility marker to a target end via a transmission path, where the compressibility marker indicates whether the data block is compressible at the target end.

In a third aspect of embodiments of the present disclosure, a computer-readable storage medium is provided that has a computer program stored thereon, where the program, when executed by a processor, implements a method for data replication, the method including acquiring, in response to receiving a data replication request, compressibility information of a data block at a source end. The method further includes determining a compressibility marker for the data block based on the compressibility information. In addition, the method further includes replicating the data block and the compressibility marker to a target end via a transmission path, where the compressibility marker indicates whether the data block is compressible at the target end.

It should be understood that the content described in the Summary of the Invention part is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which

FIG. 2 illustrates a flow chart of a method for data replication according to some embodiments of the present disclosure;

FIGS. 3A-3C illustrate schematic diagrams of scenarios in which an inline compression function is bypassed during writing to a storage medium according to some embodiments of the present disclosure;

DETAILED DESCRIPTION

Figure 1:
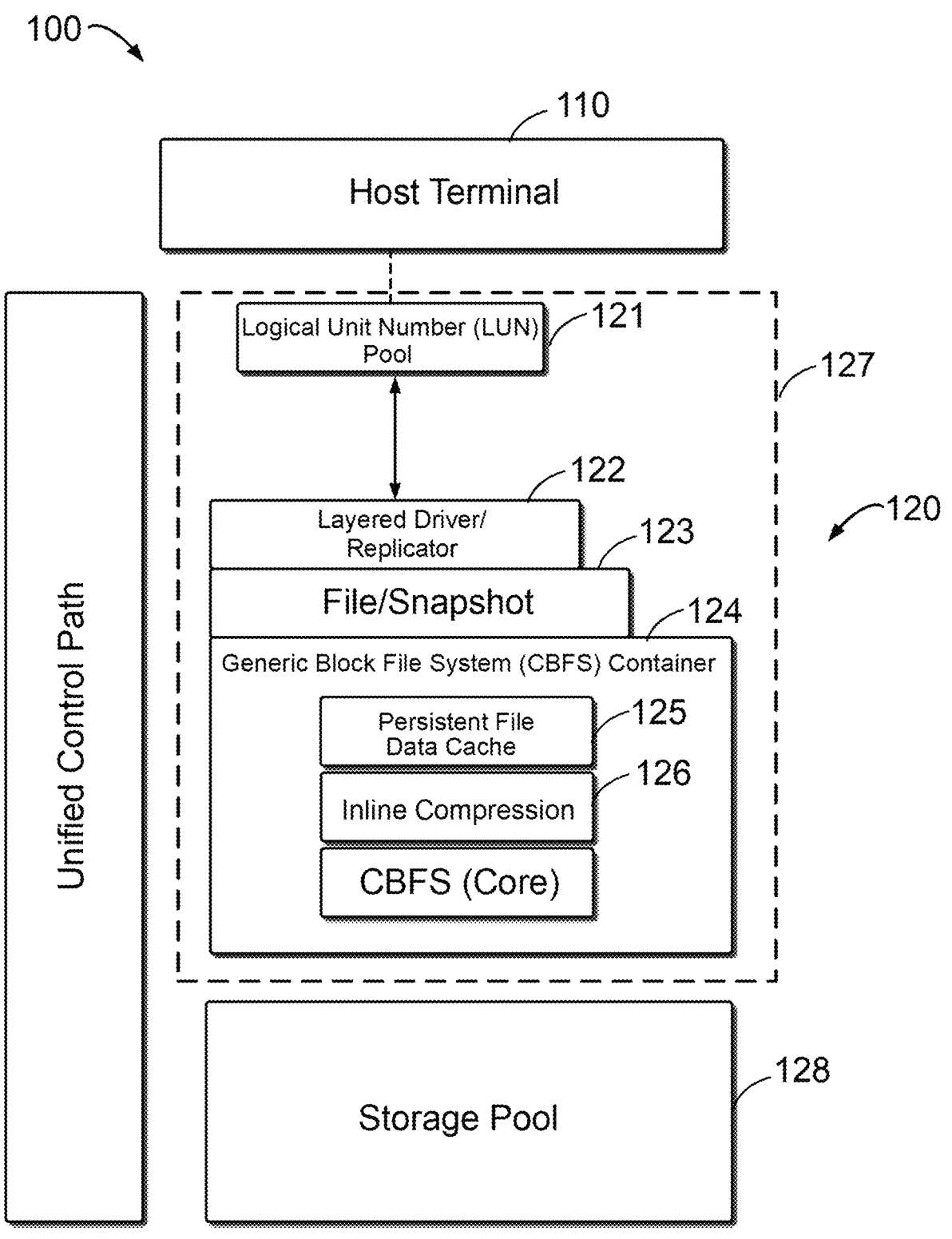
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of the embodiments of the present disclosure, the term "include" and similar terms should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In storage systems, data compression is one of the key techniques for improving the efficiency of data replication and storage. By applying a compression algorithm, the sizes of data blocks can be reduced, thereby saving the storage space and improving the transmission efficiency. However, for data blocks that have already been compressed or when the source of the data blocks is a "high-entropy file" (high entropy means that the data content has a high degree of randomness or unpredictability, and therefore may be unsuitable for compression), reapplication of the compression technology is often not that effective, because it is almost impossible to save any more space when these data blocks are further compressed. In the related art, when data blocks are replicated from a source end to a target end, these data blocks will pass through the data input/output (I/O) path at the target end. If a compression algorithm is blindly applied without checking the data blocks in advance, the central processing unit (CPU) and memory resources at the target end may be wasted on ineffective compression attempts because these compressed or encrypted data blocks can no longer be significantly compressed. In addition, ineffective compression attempts not only waste computational resources, but also may lead to extended IO response time.

To this end, embodiments of the present disclosure propose a scheme for data replication. In the embodiments of the present disclosure, a compressibility marker is attached at a source end to a data block to be replicated, and the data block and the corresponding compressibility marker are passed to a target end during the process of data replication, which enables the target end to avoid unnecessary data compression attempts as much as possible based on the compressibility marker, and thus can reduce the IO latency and improve the IO throughput. At the same time, this avoids ineffective compression of incompressible data blocks, which can reduce computational workloads and allow for a more optimal allocation of system resources. In addition, for a storage system with advanced replication (e.g., of a sector or cascading topology) enabled, the compressibility markers will be passed to the target end whenever the source end reads data. The target end can recognize these markers and thus skip compression attempts on incompressible data blocks. This method ensures that resources in the entire replication chain are utilized effectively and enhances the user experience.

FIG. 1 illustrates a schematic diagram of an example environment 100 in which a plurality of embodiments of the present disclosure can be implemented. As shown in FIG. 1, a host terminal 110 connects a logical unit number (LUN) pool 121 to a storage system 120 through a network to enable data addressing and access. Among them, the host terminal 110 may be a physical server or a host, and may be a hardware device running virtual machines and other network services. The logical unit number pool 121 is responsible for managing storage logical units to provide data storage space and may contain a collection of multiple physical storage devices (e.g., hard disks). Logical unit number (LUN) is used to identify a logical unit in a storage device. In a storage area network (SAN) environment, the host terminal 110 is connected to the storage system 120 through a network and uses an LUN as an identifier to access a specific logical unit on the storage device.

Referring to FIG. 1, through the network connection, the host terminal 110 may send a request to the storage system 120 to access the LUN so as to read and write data stored therein. Such a connection approach enables the host terminal 110 to flexibly access and manage data in the storage system 120, thereby improving the efficiency and reliability of data access.

As shown in FIG. 1, in the storage system 120, a controller 127 of the storage system is also configured. The controller 127 is a core component of the storage system 120 and is responsible for managing and controlling the operation of the entire storage system. Inside the controller 127, a layered driver/replicator 122 is the entry of the controller 127, and can be used to read actual data blocks from the source end and send them to the target end. The layered driver/replicator 122 enables layered management and optimization of the data storage performance, and can also be used for data backup and disaster recovery, thus ensuring the integrity and recoverability of data. The controller 127 is internally configured with a file/snapshot 123 to capture the state or image of the data at a time point, and the file/snapshot 123 can also periodically create a snapshot of the data to allow for data recovery if necessary.

Still referring to FIG. 1, the storage system 120 is configured with inline compression 126, where the inline compression (ILC) 126 can perform compression calculations in real time. When a write I/O request from the host terminal 110 enters a generic block file system container layer 124, the data block is maintained in a data log of a persistent file data cache 125 for compression calculations before being flushed to the back end. In some embodiments, the inline compression 126 may be implemented in real time by means of hardware or software.

Still referring to FIG. 1, in the storage system 120, a storage pool 128 is further configured for storing data blocks. Here, the storage pool 128 may be composed of hard disk drives (HDDs) or solid state disks (SSDs) or a mixture of different types of storage media, the storage pool 128 is used to store and manage a large number of data blocks, and these databases may contain various types of information, such as documents, pictures, videos, database records, and the like. In some embodiments, the storage system 120 may be located at the source end or at the target end. In some embodiments, a large storage system may be constructed from a plurality of storage systems 120.

FIG. 2 illustrates a flow chart of a method 200 for data replication according to some embodiments of the present disclosure. The storage system 120 at the source end shown with reference to FIG. 1 may serve as the execution subject of the method 200. At block 202, in response to receiving a data replication request, compressibility information of a data block at a source end is acquired. In some embodiments, the compressibility information of the data block may be filename extension information of the data block or compression rate information of the data block. In some embodiments, the compressibility information of the data block may be acquired from the host terminal or an application layer at the source end. For example, a filename extension of a data block file, such as .rar, .zip, .tgz, etc., may be acquired. In some embodiments, the compressibility information indicating that some data blocks are encrypted data blocks may be acquired, and then these data blocks may be considered incompressible. In some embodiments, it may be acquired that some data blocks are random data blocks, and then these data blocks may be considered incompressible. In some embodiments, after compression rate detection, it is found that the data can no longer be compressed again. In some embodiments, compressibility information of the data block may be acquired from a compression mapping table storing compressibility information of data blocks.

At block 204, a compressibility marker for the data block is determined based on the compressibility information. In some embodiments, if the data block has a filename extension in the form of .rar, .zip, .tgz, or the like, the compressibility marker for the data block can be considered as being incompressible. In some embodiments, if incompressibility is returned for the data block after a compression rate check of the data block, the compressibility marker for the data block is also being incompressible. In some embodiments, a random data block may be marked with an incompressibility marker. In some embodiments, if some data blocks are compressible, the compressibility markers for those data blocks are being compressible. In some embodiments, compressible data blocks may be marked in binary, for example, 1 for incompressible and 0 for compressible. In some embodiments, these compressibility markers may be recorded in a bitmap.

At block 206, the data block and the compressibility marker are replicated to a target end via a transmission path, where the compressibility marker indicates whether the data block is compressible at the target end. In some embodiments, the data block to be replicated and the compressibility marker may be replicated to the target end. In some embodiments, no further compression attempts will be made at the target end on a data block with an incompressibility marker.

By this method, compressibility markers are attached to the data blocks, which can effectively remind the target end not to perform ineffective compression on incompressible data blocks and reduce redundant computation in the replication process, thus reducing the transmission delay during data replication and improving the data processing capability. At the same time, it can also reduce the risk of failure to recover data due to long transmission delay, and achieve efficient configuration of system resources, thereby optimizing the user experience.

Figure 3A:
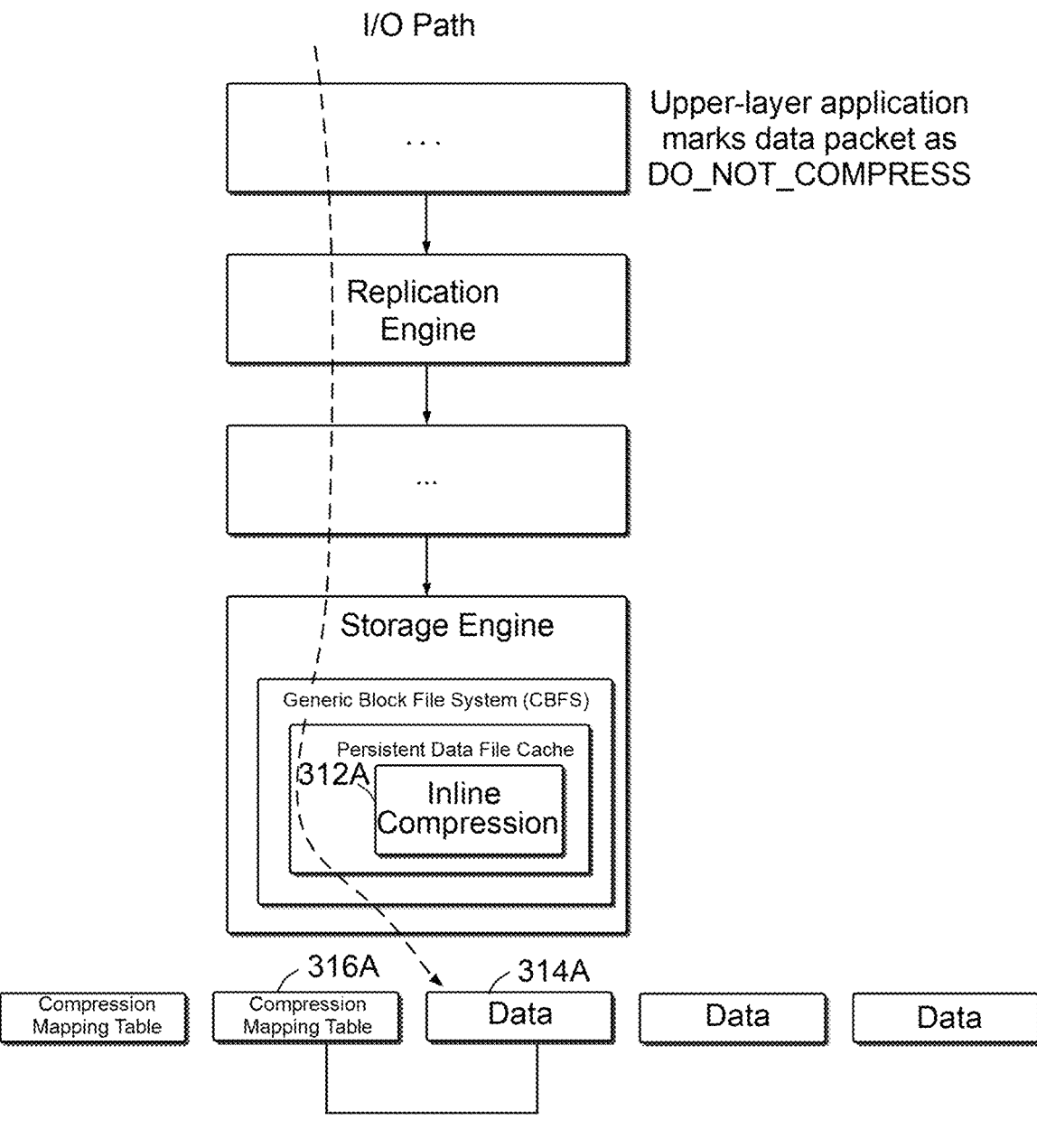
Figure 3C:
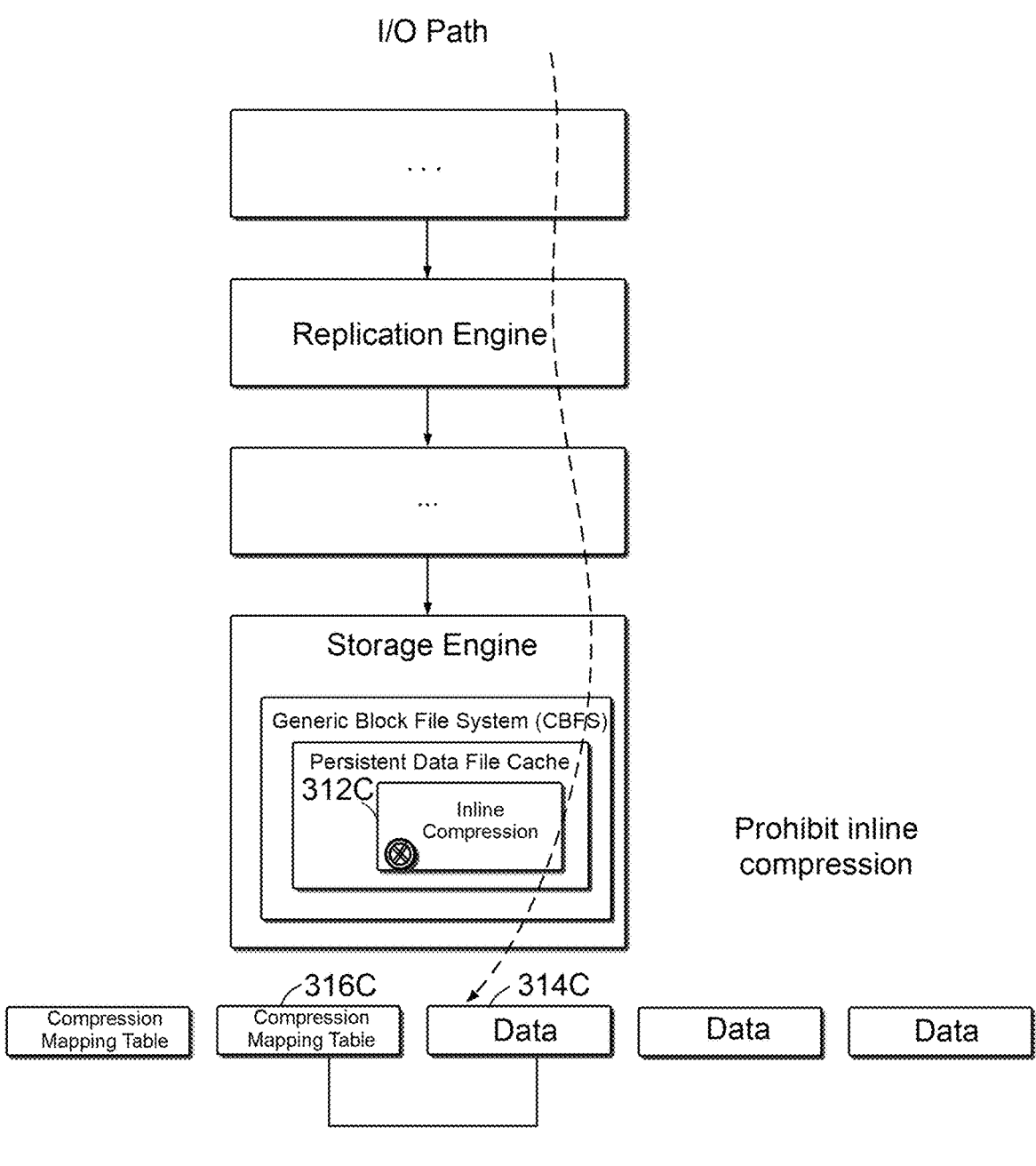

FIGS. 3A-3C illustrate schematic diagrams of scenarios in which an inline compression function is bypassed during writing to a storage medium according to some embodiments of the present disclosure. FIG. 3A illustrates a schematic diagram of a situation 300A in which an inline compression function is bypassed according to a type or a source of a data block acquired from a data application layer in some embodiments of the present disclosure. As shown in FIG. 3A, the storage system determines from the data application layer that the data block is an incompressible file (a data file with a high degree of randomness or unpredictability), for example, a .zip file, in which case the data application layer can mark the IO request packet as incompressible, and the storage system can determine according to the incompressibility marker that the file may not be compressed any further, so that the storage system can bypass inline compression 312A and store data 314A directly on the storage medium in its original format, which saves CPU and memory resources, since attempting to compress a file that has already been compressed is usually ineffective. In some embodiments, the information indicating that the data block is incompressible may be updated and recorded in a compression mapping table 316A.

A schematic diagram of a situation 300B in which no inline compression is performed after an ineffective compression attempt in some embodiments of the present disclosure will be described below in conjunction with FIG. 3B. As shown in FIG. 3B, the storage system acquires no markers from the data application layer that indicate whether or not the data blocks are compressible, and the data blocks are fed into inline compression 312B for compression efficiency checking, through which the inline compression 312B attempts to compress these data blocks, but it is found that the sizes of the compressed data blocks are not significantly reduced, and may even be increased. In this case, the storage system determines that these data blocks are incompressible and thus skips the inline compression 312B and writes data 314B directly to the storage medium, and updates a compression mapping table 316B.

Still referring to FIG. 3B, in some embodiments, if the size of the compressed data (e.g., including the compressed zip header and the compressed data block) can be populated within 16 sectors, the compressed data will be flushed to the storage medium. Otherwise, the original raw data blocks will be flushed, and all resources allocated for the compression check operation will be released. In some embodiments, a preliminary compression determination may be made at the protocol layer before the data blocks are transmitted to the storage layer such as a storage medium, and if the protocol layer determines that the data is already in a compressed format or is incompressible, the storage system will mark these data as incompressible, and thus bypass the inline compression 312B. For example, when transmitting through a network a data file that has been encrypted, the protocol layer may detect the high degree of randomness of this data file and thus determine that the encrypted data file is not suitable for being further compressed.

A schematic diagram of a situation 300C in which inline compression is bypassed in the case of resource shortage in some embodiments of the present disclosure will be described below in conjunction with FIG. 3C. Referring to FIG. 3C, in some embodiments, an inline compression function 312C is temporarily disabled for some reason (e.g., shortage of system resources or manual suspension). During this period, all data entering the storage system, whether they are compressible or not, are not processed by the inline compression 312C. These data 314C will be written directly to a storage medium in the original format. Even if some of these data could have been compressed to save space, this compression process will not happen because the inline compression 312C is suspended. In some embodiments, after the data 314C is written to the storage medium, the compressibility information for that data 314C may be updated in a compression mapping table 316C.

By means of this method of bypassing the inline compression of incompressible data blocks and distinguishing compressible and incompressible data blocks, the efficiency of data processing can be improved, while truly compressible data blocks can be compressed, thus saving storage space. In addition, by distinguishing compressibility and incompressibility, the system can optimize the allocation of resources, thus enhancing the user experience.

Figure 4A:
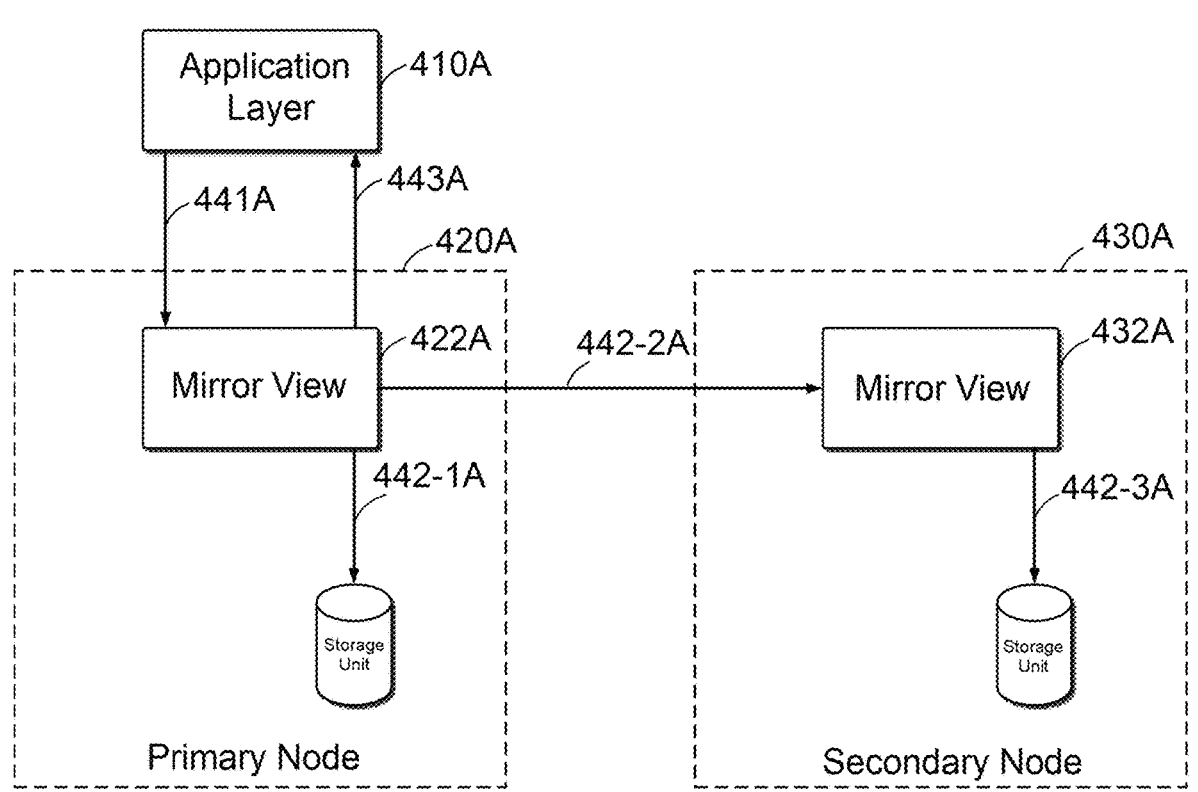
FIGS. 4A-4B illustrate schematic diagrams for synchronous replication of data according to some embodiments of the present disclosure.
Figure 4B:
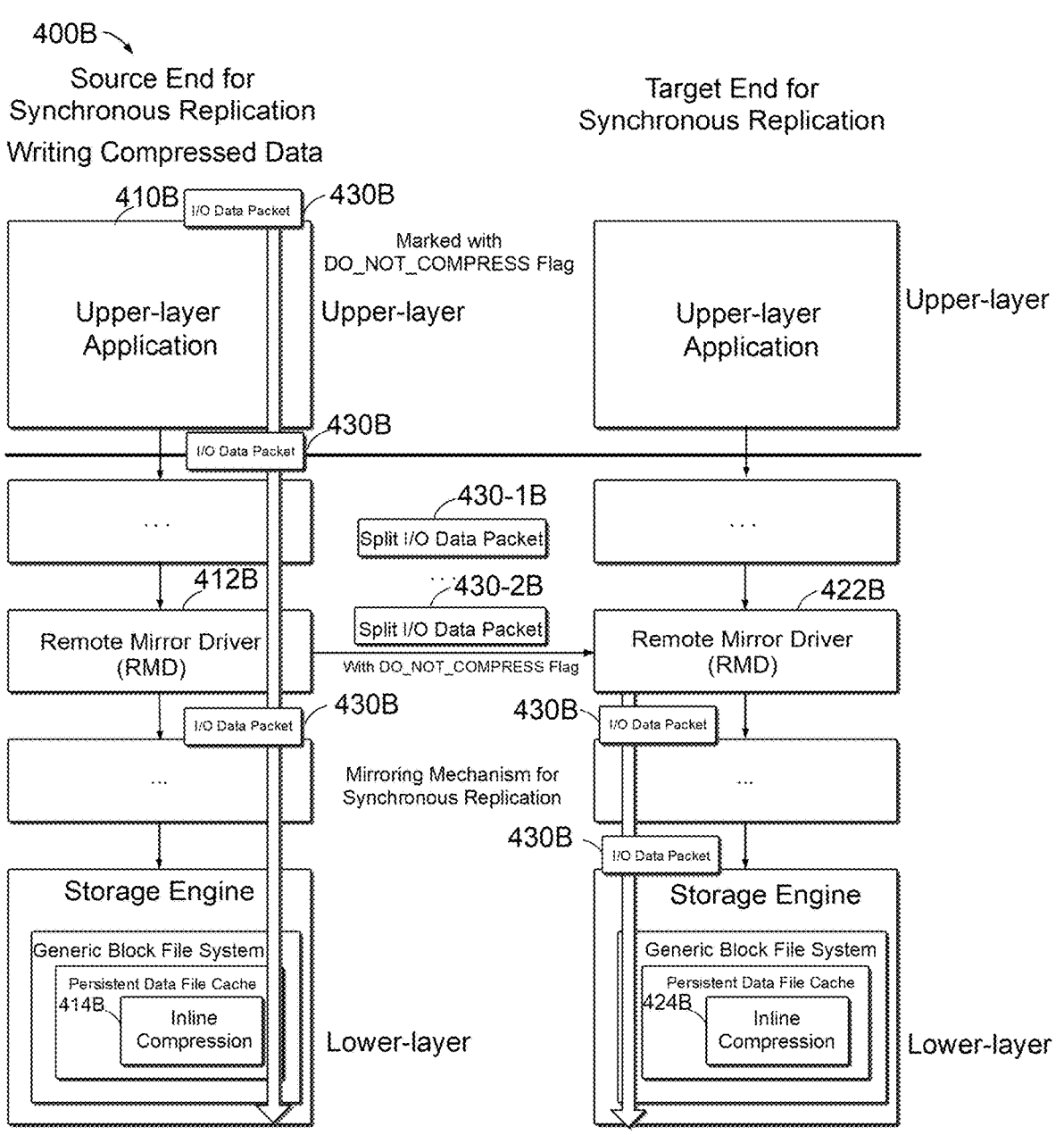

FIGS. 4A-4B illustrate schematic diagrams for synchronous replication of data in some embodiments of the present disclosure. A schematic diagram of a situation 400A for synchronous replication of data in some embodiments of the present disclosure will be described below in conjunction with FIG. 4A. Referring to FIG. 4A, the synchronous replication in the storage system uses a mirror view to replicate data from a primary node 420A to a secondary node 430A, and when a write request occurs, the mirror view splits this request to ensure that the data is written both to the local primary node 420A and to the remote secondary node 430A, so that the consistency of the data can be ensured. In some embodiments, the mirror view and the remote mirror driver (RMD) have the same functionality. In some embodiments, the remote mirror driver may use a fixed bitmap to track any changes to the mirror in a fractured state, and then transmit same to the remote site during resynchronization. In some embodiments, the mirror view or the remote mirror driver does not directly interact with the underlying components (e.g., logs, caches, or the like) of the storage system. Instead, these underlying components are encapsulated as a logical device to provide a contiguous address space to the mirror view or the remote mirror.

As shown in FIG. 4A, a write request is first issued by an application layer 410A via 441A, which is the starting point for writing data to the primary node 420A. After receiving the write request, a local primary mirror view 422A may write the data correctly into the storage medium of the primary node 420A via 442-1A at the local primary node, and will also replicate the data into a secondary mirror view 432A of a secondary node 430A via 442-2A, and the secondary mirror view 432A also writes data to the storage medium of a secondary node 430 via 442-3A and waits for successful data writing by both the primary node 420A and the secondary node 430A before returning acknowledgment information via 443A. By this method, it is possible to ensure that the data is synchronized between the local and remote sites.

A schematic diagram of a situation 400B in which a compressibility marker and a data block are sent from a source end to a target end during synchronous replication in some embodiments of the present disclosure will be described below in conjunction with FIG. 4B. Referring to FIG. 4B, at the source end of the synchronous replication, during the process of writing data, an upper layer application 410B can differentiate between sources of an I/O data packet 430B and if it is detected that the I/O request is from a file of high randomness or a file that has already been compressed, a DO_NOT_COMPRESS marker may be added to the request of the I/O data packet 430B. This marker is passed along with the I/O data packet 430B to a lower layer of the storage system, and this marker can instruct the storage system to bypass inline compression 414B and to write this data packet directly to the storage medium without the need for on-the-fly inline compression of this data packet.

Still referring to FIG. 4B, in the case of synchronous replication of data, the remote mirror driver 412B at the source end may split the I/O data packet 430B into I/O data packets 430-1B and 430-2B, and so on, and add a DO_NOT_COMPRESS marker to the I/O block header. When this I/O block with the marker is transmitted to the target end through a network such as a fiber channel, the remote mirror driver 422B at the target end reads this marker and generates an I/O data packet 430B with the same marker, and then passes same to the lower layer at the target end for processing, and the storage system at the target end decides whether or not to go through inline compression 424B according to the marker.

In this way, the system can skip the on-the-fly inline compression step for certain specific types of I/O requests, thereby improving the processing efficiency. This is particularly useful for a file with a high degree of randomness, in which case further compression may not result in significant storage space savings, but rather increase processing time and computational resource consumption.

Figure 5A:
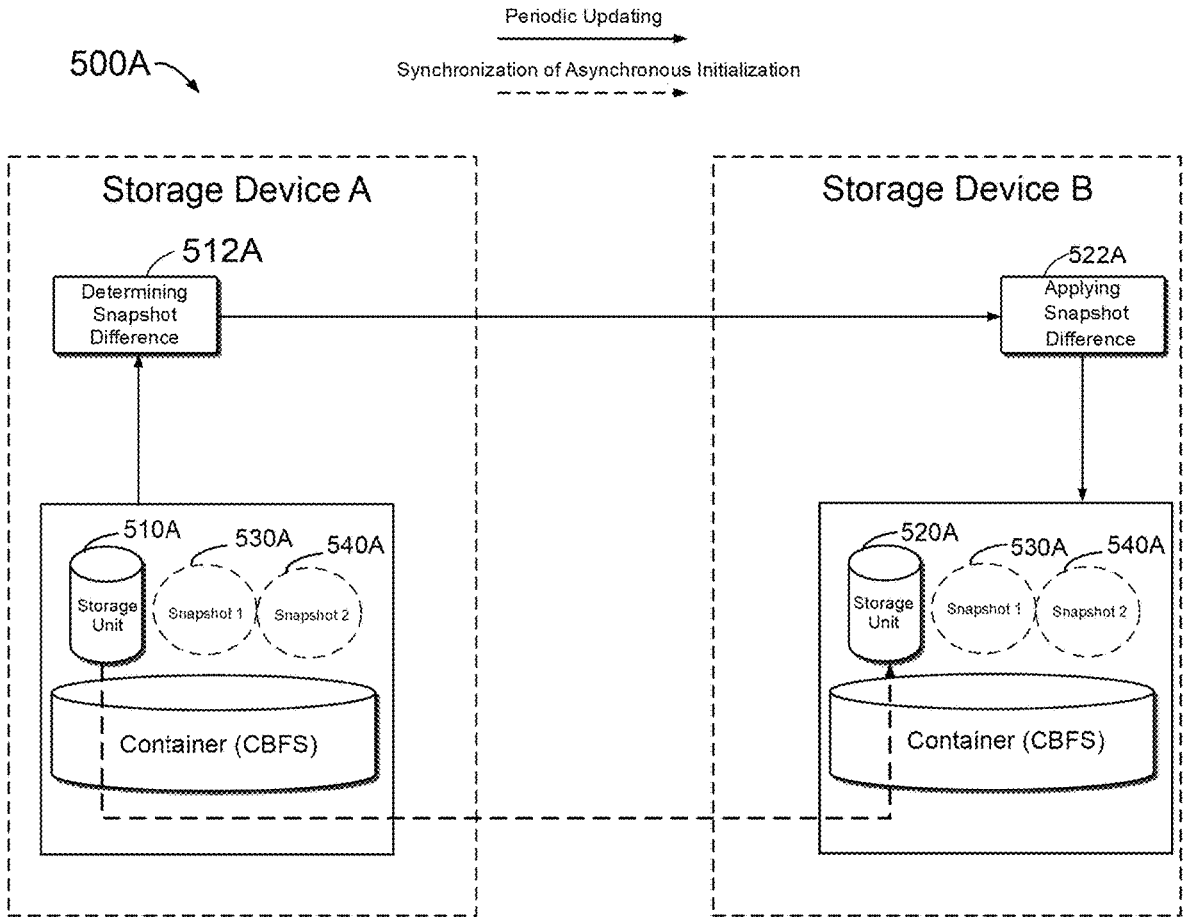
FIGS. 5A-5B illustrate schematic diagrams for asynchronous replication of data according to some embodiments of the present disclosure.
Figure 5B:
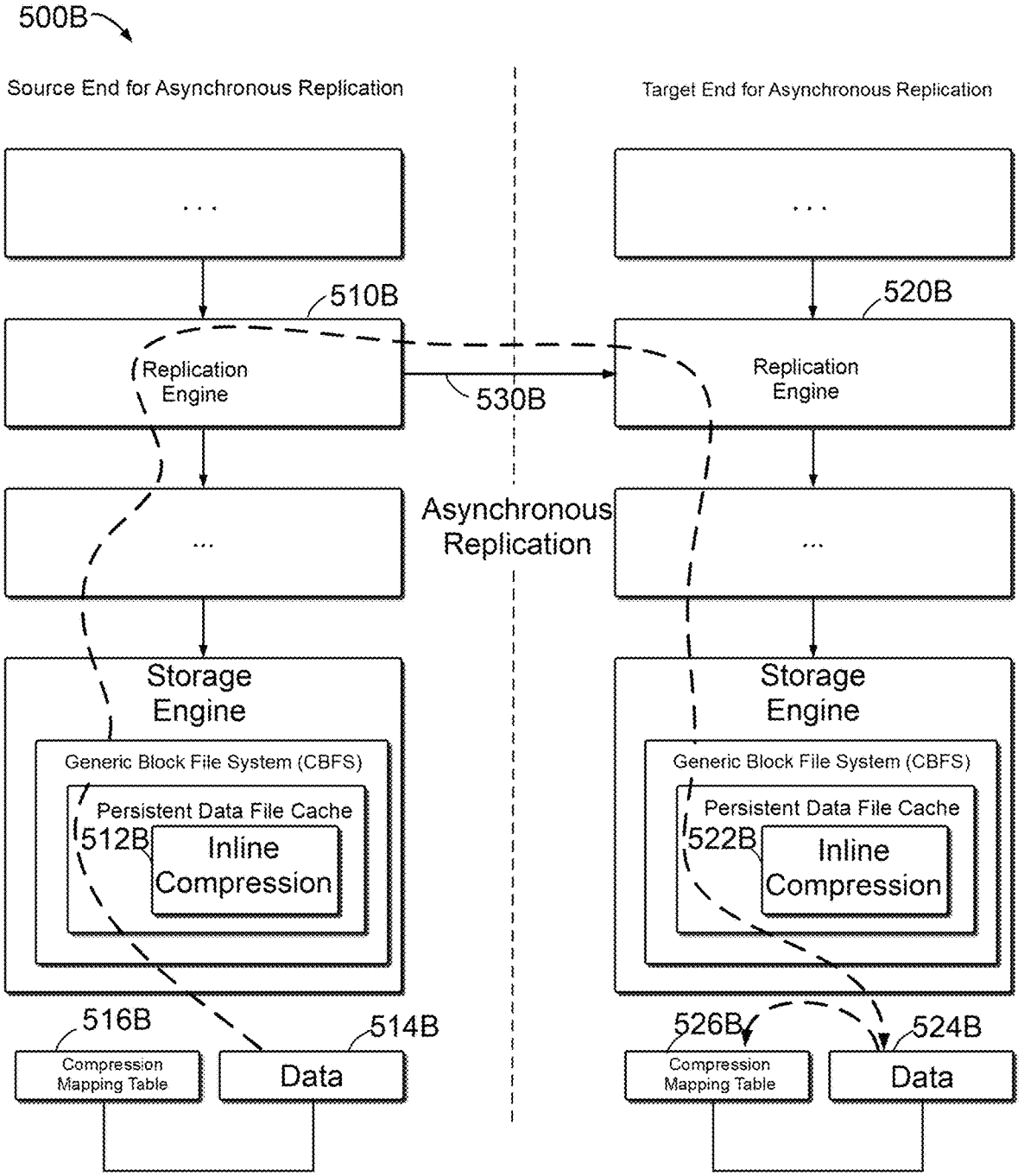

FIGS. 5A-5B illustrate schematic diagrams for asynchronous replication of data according to some embodiments of the present disclosure. FIG. 5A illustrates a schematic diagram of a situation 500A for asynchronous replication of data in some embodiments of the present disclosure. Asynchronous replication utilizes snapshots to replicate point-in-time consistent copies of a plurality of volumes. Asynchronous replication does not require that the target end be a mirror of the source on every I/O at the same time, but only that the target end be periodically synchronized with the source on a recovery point objective (RPO). The recovery point objective is the acceptable amount of data that can be lost due to an interruption, which is measured in units of time. This time difference affects the amount of data that must be replicated during the next synchronization.

As shown in FIG. 5A, some data has been accumulated in the storage unit 510A in the storage device A, and the snapshot 1 530A also records the state of data in the storage device A at the time of initialization, and the storage device B can refresh the data into the same state as the data in the storage device A according to the snapshot 1 530A, at which time the data have been successfully synchronized between the storage device A and the storage device B (which may be referred to as the "IN_SYNC" state), and the data are identical between them, in which case the storage device A and the storage device B have a common base snapshot pair 530A. In other words, the "IN_SYNC" state means that the data replication or synchronization process between the source end, such as the storage device A, and the target end, such as the storage device B, has been completed, and the data contents of the two sides match and there is no data loss or difference. However, due to the characteristics of asynchronous replication, this state may only be temporary, as the data of the source end storage device A may continue to change, while the data of the target end storage device B will be updated in the next synchronization cycle.

Still referring to FIG. 5A, the storage device A and the storage device B may utilize snapshots to implement asynchronous replication. After the initial synchronization is complete, and after a certain number of cycles, there is some data accumulated on the storage device A, the storage device A may create and generate a snapshot 2 540A of the data after the certain number of cycles, the source end storage device A will determine a snapshot difference (the data difference between the snapshot 530 and the snapshot 540) at 512A and send same to the storage device B, and the storage device B may apply the snapshot difference at 522A to import the difference into the storage device in an incremental manner. Specifically, in conjunction with FIG. 5B, an asynchronous replication engine 510B in the source end, i.e., the storage device A, may read the actual data from the storage device A according to the result of the snapshot difference and send it to the target end, i.e., the storage device B, and after waiting for the data update of the storage unit 520A in the storage device to be completed, the snap-shot 2 540A in the storage device B is also consistent with the snapshot 2 540A in the storage device A. In some embodiments, in the process of determining the snapshot difference at 512A, a periodic snapshot-based update of the difference may be performed by enumerating the differences in metadata between the public base snapshot and the most recent snapshot. The asynchronous replication engine 510B will then read the actual data blocks from the source end according to the result and send them to the target end.

In this way, after the initial synchronization, the storage system can update the data by means of comparison of the difference between the base snapshot and the most recent snapshot, and this approach improves the efficiency of data transmission.

The process of sending a compressibility marker and a data block from a source end to a target end during an asynchronous replication process in some embodiments of the present disclosure will be described below in conjunction with FIG. 5B. FIG. 5B illustrates a schematic diagram of a situation 500B in which a compressibility marker and a data block are sent from a source end to a target end during asynchronous replication according to some embodiments of the present disclosure. A source end replication engine 510B for asynchronous replication will read data 514B from the underlying layer and transmit it to a replication engine 520B at the target end, and the replication engine 520B at the target end will then store the read data in the storage medium at the target end. In this process, the target replication engine at the source end may simultaneously acquire information about the compressibility marker in the compression map-ping table 516B as it reads the data 514B. In some embodi-ments, at the time the data is written into the storage medium at the source end, the compressibility marker for the data block has been recorded by the inline compression 512B in the compression mapping table 516B. The asynchronous replication engine 510B at the source end may populate the information in the compression mapping table into the I/O block header in the I/O request and send it to the replication engine 520B at the target end. The replication engine 520B at the target end may read these markers and determine whether to bypass inline compression 522B, then store the data in a storage medium 524B at the target end, and also update a compression mapping table 526B at the target end. In some embodiments, descriptive information about whether a data block can be compressed is stored in a compression mapping table, so that it can be determined by consulting the compression mapping table as to whether or not this data block can be compressed.

Figure 5C:
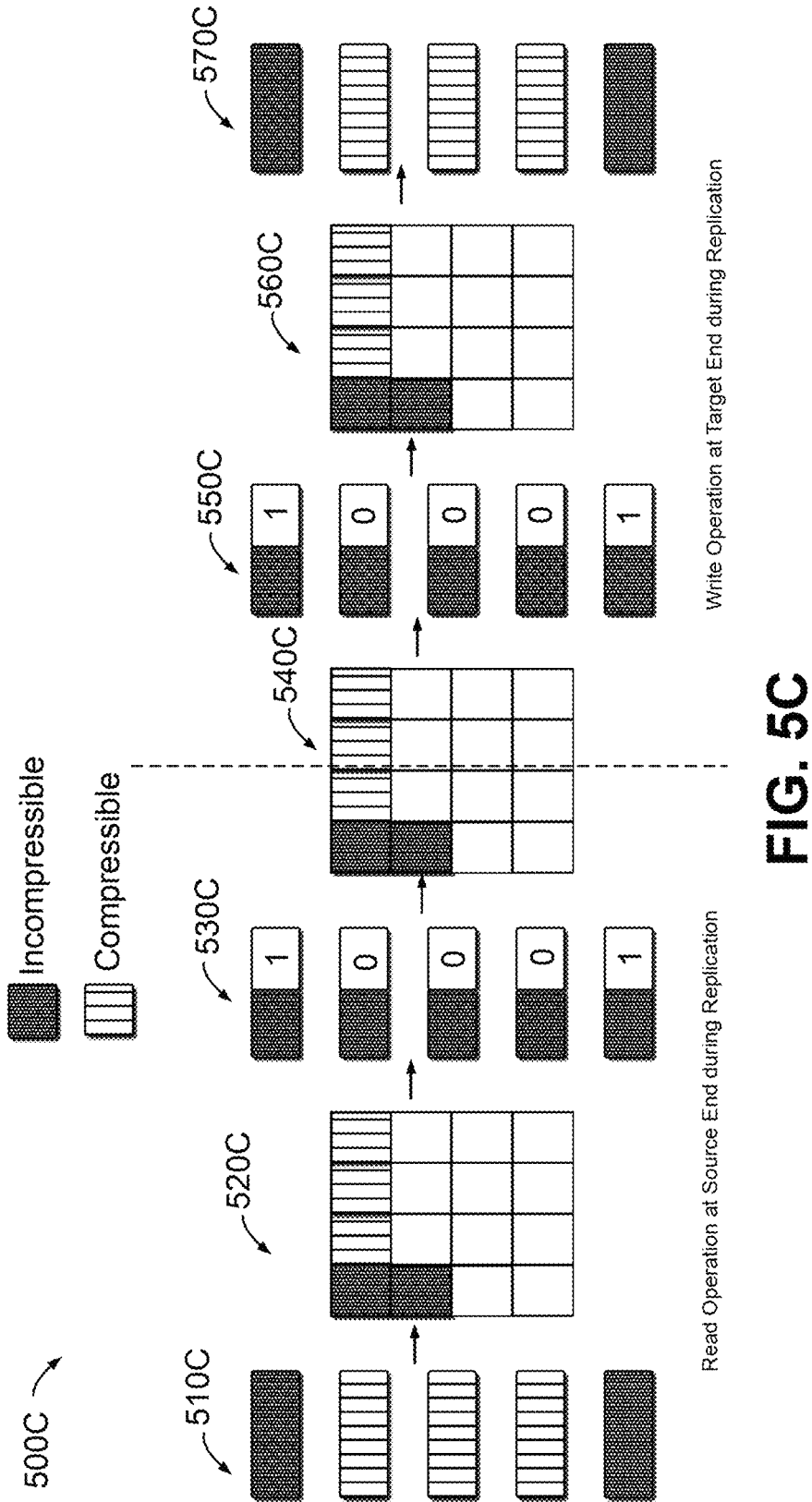
FIG. 5C illustrates a schematic diagram for transmitting a bitmap of a compressibility marker as well as a data block during a replication process according to some embodiments of the present disclosure.

In conjunction with FIG. 5C, FIG. 5C illustrates a sche-matic diagram of a data replication process 500C for passing a compressibility marker via a bitmap in some embodiments of the present disclosure. With reference to FIGS. 5B and 5C, at 510C, the replication 510B at the source end reads the data block 514B from the underlying layer and marks the bitmap in 520C with a corresponding marker according to the compressibility information for the data block in the compression mapping table 516B. In conjunction with FIG. 5B, the bitmap in the storage engine will be presented in the form of 520C. Then at 530C, the data block list is combined into an I/O request and a new bitmap (e.g., an 8-byte bitmap) is appended to indicate the compressibility information for each data block, and it is sent to a fiber channel 530B at 540C. While the addition of a bitmap introduces some additional overhead (each I/O request header requires an additional 8 bytes to store this bitmap), it has the benefit of avoiding unnecessary compression efficiency checking at the target end, thereby improving the overall data processing efficiency. For back-end storage, it only requires 1 bit to represent the compressibility of each data block, so this overhead is relatively small.

Still referring to FIGS. 5B and 5C, after the replication engine 520B at the target end receives the I/O request at 550C, a compressibility flag for each data block will be calculated according to the bitmap in the I/O request header at 560C and shall be remapped as an "incompressibility" flag ("incompressibility" represents an instruction) for use by the inline compression 522B at the lower layer, and these data blocks 524B will be stored in the storage medium at the target end.

Still referring to FIG. 5B, when an incompressible data block enters the storage system at the target end, it will bypass the inline compression 522B directly. No compres-sion efficiency checks will be performed to avoid ineffective compression attempts and thus improve the performance, since once it is determined to be incompressible at the source end, it is considered incompressible at the target end as well. In conjunction with FIG. 5C, at 570C, the compressibility information may also be stored in the compression mapping table 526B at the target end so that future replication sessions may continue to use such information. This com-pressibility information can also be used, for example, for resynchronization after a replication session failover and for cascading replication to the target end of the target end.

Still referring to FIG. 5C, in some embodiments, the process of the data replication process 500C for passing a compressibility marker via a bitmap is applicable to an initialization phase of synchronous replication or to re-replication after an interruption. In some embodiments, the process of the data replication process 500C of passing a compressibility marker via a bitmap is applicable to an initialization phase of asynchronous replication and to a cascading replication process of asynchronous replication. In some embodiments, synchronous replication works through a mirror view or a remote mirror driver, and asynchronous replication works through a replication engine. In conjunction with FIG. 4A, in some embodiments, the initialization transmission phase in synchronous repli-cation (unlike the IN_SYNC phase, this phase has a data source that is not the application layer 410A but the storage unit at the source end) can transmit compressibility infor-mation by following the same principle as asynchronous replication, which in turn can avoid ineffective compression attempts at the target end, thereby improving the perfor-mance of the system.

In this way, the transmission delay during data replication can be reduced, and the data throughput can be increased. At the same time, the risk of failing to recover data due to long transmission delay can be reduced. In addition, the method where compression attempts are no longer made on incompressible data blocks at the target end reduces unnecessary computation during the replicated data process, which enables efficient utilization of system resources and improves the user experience.

Figure 6:
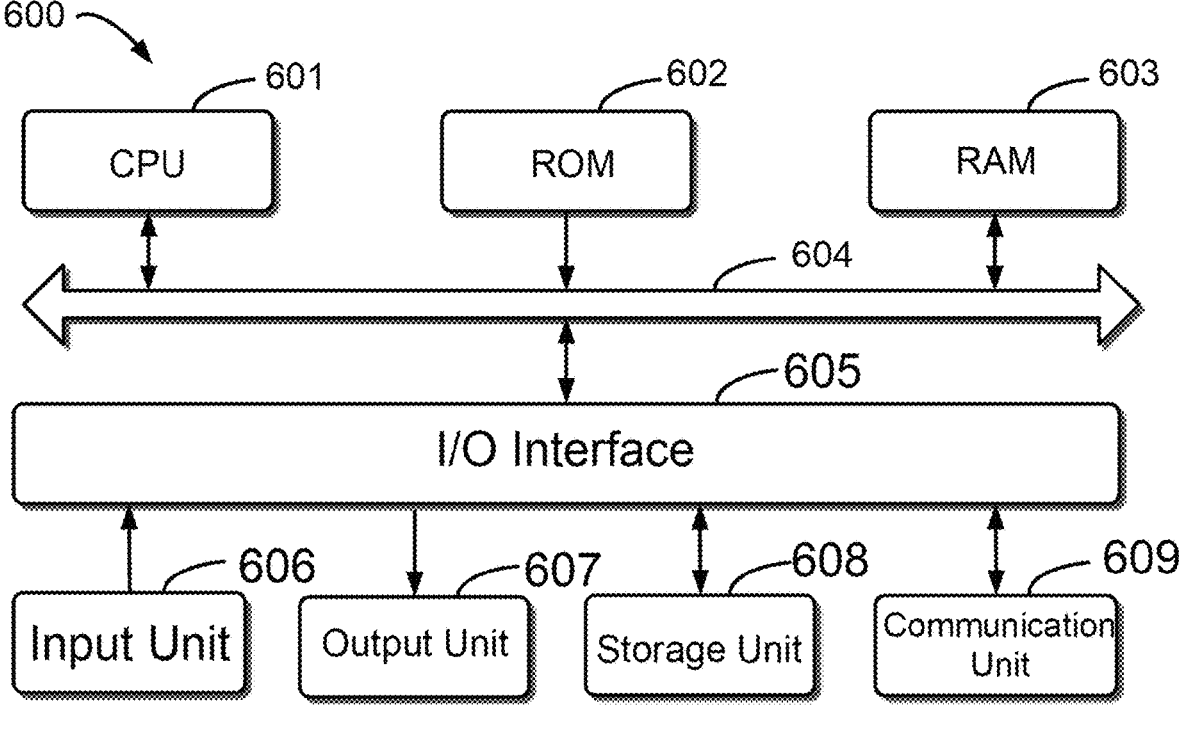
FIG. 6 illustrates a block diagram of a device that can implement a plurality of embodiments of the present disclosure.

FIG. 6 illustrates a schematic block diagram of an example device 600 that can be used to implement embodiments of the present disclosure. As shown in the figure, the device 600 includes a computing unit 601 that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The computing unit 601 may be various general-purpose and/or special-purpose processing components with processing and computing power. Some examples of the computing unit 601 include, but are not limited to, a central processing unit (CPU), a graphics processing unit (GPU), various specialized artificial intelligence (AI) computing chips, various computing units for running machine learning model algorithms, a digital signal processor (DSP), and any appropriate processor, controller, microcontroller, and the like. The computing unit 601 performs various methods and processes described above, such as the method 300. For example, in some embodiments, the method 300 may be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded to the RAM 603 and executed by the computing unit 601, one or more steps of the method 300 described above may be performed. Alternatively, in other embodiments, the computing unit 601 may be configured to perform the method 300 in any other suitable manners (such as by means of firmware).

The functions described hereinabove may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for data replication, comprising:
acquiring, in response to receiving a data replication request, compressibility information of a data block at a source end;
determining a compressibility marker for the data block based on the compressibility information; and
replicating the data block and the compressibility marker to a target end via a transmission path, wherein the compressibility marker indicates whether the data block is compressible at the target end;
wherein acquiring, in response to receiving a data replication request, compressibility information of a data block at a source end comprises:
acquiring the compressibility information of the data block from a data application layer of a first layer at the source end; or acquiring the compressibility information of the data block from a compression mapping table of a second layer at the source end;

wherein acquiring the compressibility information of the data block from a compression mapping table of a second layer at the source end comprises:

recording the compressibility information of the data block to the compression mapping table of the second layer at the source end;

wherein recording the compressibility information of the data block to the compression mapping table of the second layer at the source end comprises:

determining the compressibility information of the data block based on a compression rate of the data block;

determining the compressibility information of the data block based on an inline compression function being stopped; or determining the compressibility information of the data block based on protocol layer compression, the protocol layer compression being used to compress the data block before sending the data block to a network; and wherein replicating the data block and the compressibility marker to a target end via a transmission path comprises:

electronically transmitting, over a communications network between the source end and the target end, a set of data packets containing data of the data block and the compressibility marker; and storing, based on the data of the data block and the compressibility marker, a copy of the data block and a copy of the compressibility marker in a set of data storage devices at the target end.

2. The method according to claim 1, wherein acquiring the compressibility information of the data block from a data application layer of a first layer at the source end comprises:

acquiring a source type of the data block from the data application layer of the first layer at the source end; and determining the compressibility information of the data block based on the source type of the data block, wherein the source type indicates whether the data block is compressible.

3. The method according to claim 2, wherein determining a compressibility marker for the data block based on the compressibility information comprises:

adding an incompressibility marker indicative of the data block to a transmission request data packet at the first layer in response to the source type indicating that the data block is incompressible, wherein the incompressibility marker indicates that the data block is incompressible at the target end.

4. The method according to claim 1, wherein replicating the data block and the compressibility marker to a target end via a transmission path comprises:

sending the transmission request data packet to the target end based on a remote mirror driver of the source end, the transmission request data packet comprising at least the data block and the compressibility marker.

5. The method according to claim 1, wherein determining a compressibility marker for the data block based on the compressibility information comprises:

marking the data block as compressible in a bitmap corresponding to the data block in response to the data block being compressible; and marking the data block as incompressible in the bitmap in response to the data block being incompressible.

6. The method according to claim 5, wherein replicating the data block and the compressibility marker to a target end via a transmission path comprises:

converting the bitmap at the source end that corresponds to the data block into the compressibility marker for the data block; and replicating a transmission request data packet to the target end via the transmission path based on a replication engine of the source end, the transmission request comprising at least the compressibility marker and the data block.

7. The method according to claim 6, further comprising:

replicating the data block and the compressibility marker to the target end based on the compression mapping table in response to the data replication being performed in an asynchronous replication approach.

8. The method according to claim 1, wherein replicating the data block and the compressibility marker to a target end via a transmission path further comprises:

prior to storing the copy of the data block, reading the compressibility marker from the set of data packets at the target end; and after reading the compressibility marker, performing an assessment operation that indicates whether to perform compression at the target end based on the compressibility marker.

9. An electronic device, comprising:

at least one processor; and coupled to the at least one processor and having instructions stored thereon, wherein the instructions, when executed by the at least one processor, cause the electronic device to perform actions comprising:

acquiring, in response to receiving a data replication request, compressibility information of a data block at a source end;

determining a compressibility marker for the data block based on the compressibility information; and replicating the data block and the compressibility marker to a target end via a transmission path, wherein the compressibility marker indicates whether the data block is compressible at the target end;

wherein acquiring, in response to receiving a data replication request, compressibility information of a data block at a source end comprises:

acquiring the compressibility information of the data block from a data application layer of a first layer at the source end; or acquiring the compressibility information of the data block from a compression mapping table of a second layer at the source end;

wherein acquiring the compressibility information of the data block from a compression mapping table of a second layer at the source end comprises:

recording the compressibility information of the data block to the compression mapping table of the second layer at the source end;

wherein recording the compressibility information of the data block to the compression mapping table of the second layer at the source end comprises:

determining the compressibility information of the data block based on a compression rate of the data block;

determining the compressibility information of the data block based on an inline compression function being stopped; or determining the compressibility information of the data block based on protocol layer compression, the protocol layer compression being used to compress the data block before sending the data block to a network; and wherein replicating the data block and the compressibility marker to a target end via a transmission path comprises:

electronically transmitting, over a communications network between the source end and the target end, a set of data packets containing data of the data block and the compressibility marker; and storing, based on the data of the data block and the compressibility marker, a copy of the data block and a copy of the compressibility marker in a set of data storage devices at the target end.

10. The electronic device according to claim 9, wherein acquiring the compressibility information of the data block from a data application layer of a first layer at the source end comprises:

acquiring a source type of the data block from the data application layer of the first layer at the source end; and determining the compressibility information of the data block based on the source type of the data block, wherein the source type indicates whether the data block is compressible.

11. The electronic device according to claim 10, wherein determining a compressibility marker for the data block based on the compressibility information comprises:

adding an incompressibility marker indicative of the data block to a transmission request data packet at the first layer in response to the source type indicating that the data block is incompressible, wherein the incompressibility marker indicates that the data block is incompressible at the target end.

12. The electronic device according to claim 9, wherein replicating the data block and the compressibility marker to a target end via a transmission path comprises:

sending the transmission request data packet to the target end based on a remote mirror driver of the source end, the transmission request data packet comprising at least the data block and the compressibility marker.

13. The electronic device according to claim 9, wherein determining a compressibility marker for the data block based on the compressibility information comprises:

marking the data block as compressible in a bitmap corresponding to the data block in response to the data block being compressible; and marking the data block as incompressible in the bitmap in response to the data block being incompressible.

14. The electronic device according to claim 13, wherein replicating the data block and the compressibility marker to a target end via a transmission path comprises:

converting the bitmap at the source end that corresponds to the data block into the compressibility marker for the data block; and replicating a transmission request data packet to the target end via the transmission path based on a replication engine of the source end, the transmission request comprising at least the compressibility marker and the data block.

15. A computer program product having a non-transitory computer readable medium which stores a set of instructions to perform data replication; the set of instructions, when carried out by computerized circuitry, causing the computerized circuitry to perform a method of:

acquiring, in response to receiving a data replication request, compressibility information of a data block at a source end;

determining a compressibility marker for the data block based on the compressibility information; and replicating the data block and the compressibility marker to a target end via a transmission path, wherein the compressibility marker indicates whether the data block is compressible at the target end;

wherein acquiring, in response to receiving a data replication request, compressibility information of a data block at a source end comprises:

acquiring the compressibility information of the data block from a data application layer of a first layer at the source end; or acquiring the compressibility information of the data block from a compression mapping table of a second layer at the source end;

wherein acquiring the compressibility information of the data block from a compression mapping table of a second layer at the source end comprises:

recording the compressibility information of the data block to the compression mapping table of the second layer at the source end;

wherein recording the compressibility information of the data block to the compression mapping table of the second layer at the source end comprises:

determining the compressibility information of the data block based on a compression rate of the data block;

determining the compressibility information of the data block based on an inline compression function being stopped; or determining the compressibility information of the data block based on protocol layer compression, the protocol layer compression being used to compress the data block before sending the data block to a network; and wherein replicating the data block and the compressibility marker to a target end via a transmission path comprises:

electronically transmitting, over a communications network between the source end and the target end, a set of data packets containing data of the data block and the compressibility marker; and storing, based on the data of the data block and the compressibility marker, a copy of the data block and a copy of the compressibility marker in a set of data storage devices at the target end.

* * * * *